US008633932B1

(12) United States Patent
Pighin et al.

(10) Patent No.: US 8,633,932 B1
(45) Date of Patent: Jan. 21, 2014

(54) ANIMATION WITH ADJUSTABLE DETAIL LEVEL

(75) Inventors: Frederic P. Pighin, Sausalito, CA (US); Jerome Scholler, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 350 days.

(21) Appl. No.: 12/504,263

(22) Filed: Jul. 16, 2009

(51) Int. Cl.
*G06T 13/00* (2011.01)
*G06K 9/00* (2006.01)
*G06K 9/36* (2006.01)
*G06K 9/46* (2006.01)

(52) U.S. Cl.
USPC ............ 345/473; 382/118; 382/232; 382/243

(58) Field of Classification Search
USPC .................................. 345/473; 382/118–243
See application file for complete search history.

(56) References Cited

U.S. PATENT DOCUMENTS

| 5,818,463 | A | 10/1998 | Tao et al. |
| 6,606,095 | B1 | 8/2003 | Lengyel et al. |
| 7,062,073 | B1 * | 6/2006 | Tumey et al. .................. 382/118 |
| 7,508,990 | B2 * | 3/2009 | Pace ............................... 382/236 |
| 2005/0100319 | A1 * | 5/2005 | Saed ................................ 386/69 |
| 2009/0142029 | A1 * | 6/2009 | Lin et al. ......................... 386/52 |

OTHER PUBLICATIONS

Lewis, J.P., "Fast Template Matching," Vision Interface 95, Canadian Image Processing and Pattern Recognition Society, Quebec City, Canada, May 15-19, 1995, pp. 120-123.

* cited by examiner

*Primary Examiner* — David T Welch
*Assistant Examiner* — Matthew D Salvucci
(74) *Attorney, Agent, or Firm* — Kilpatrick Townsend & Stockton LLP

(57) ABSTRACT

A system includes a computing device that includes a memory for storing one or more animations (e.g., a first and a second animation), and a model compressor. The model compressor quantifies similarities between the first animation and the second animation, and, groups the first and second animation based upon the quantified similarities. The model compressor is also configured to compress the first animation and the second animation to produce a first model that represents the content of the first animation and the second animation.

33 Claims, 9 Drawing Sheets

ANIMATION WITH ADJUSTABLE DETAIL LEVEL

TECHNICAL FIELD

This document relates to animations, such as computer graphic characters, which are capable of being adjusted for various levels of detail.

BACKGROUND

Various techniques may be implemented to produce animations such as animated characters. For example, blendshape animation or other similar techniques may be used for producing animated characters for movie and television production. Through such techniques, complex animations such as facial animations may be produced with several hundred blendshapes that may be accessible from an extensive library. As such, a considerable amount of computational power and memory resources may be needed to produce animations for such projects.

SUMMARY

The systems and techniques described here relate to producing models, which include a finite number of shapes, from a series of animations. Along with reducing memory needs for storing the finite shapes, the models may be efficiently transferred to one or more computing devices (e.g., a game console).

In one aspect, a computer-implemented method includes quantifying similarities between a first animation and a second animation, and, grouping the first and second animation based upon the quantified similarities. The method also includes compressing the first animation and the second animation to produce a first model that represents the content of the first animation and the second animation.

Implementations may include any or all of the following features. For example, the first model may include a number of shapes such as sixteen shapes. The shapes of the first model may be shared by other models, such as a second model. One or more techniques may be implemented for compressing the first and second animation, for example, principal component analysis may be performed. In one implementation, compressing the first animation and the second animation may include compressing the first animation and updating the compressed first animation with the second animation. Also, updating the compressed first animation may include adjusting a principal component analysis vector. Updating the compressed first animation may include disregarding a portion of the second animation, or other similar operations. The animations may represent various types of content. For example, the first animation and the second animation may be associated with facial expressions of an online animated character. For such a situation, quantifying similarities may include quantifying similar movements of features of the face of the online animated character. The produced model may be used in various applications and computing devices, for example, the online character may be included in a video game.

In another aspect, a system includes a computing device that includes a memory for storing one or more animations (e.g., a first and a second animation), and a model compressor. The model compressor quantifies similarities between the first animation and the second animation, and, groups the first and second animation based upon the quantified similarities. The model compressor is also configured to compress the first animation and the second animation to produce a first model that represents the content of the first animation and the second animation.

In another aspect, a computer program product tangibly embodied in an information carrier and comprising instructions that when executed by a processor perform a method that includes quantifying similarities between a first animation and a second animation, and, grouping the first and second animation based upon the quantified similarities. The method also includes compressing the first animation and the second animation to produce a first model that represents the content of the first animation and the second animation.

DESCRIPTION OF DRAWINGS

Like reference symbols in the various drawings indicate like elements.

DETAILED DESCRIPTION

Figure 1:
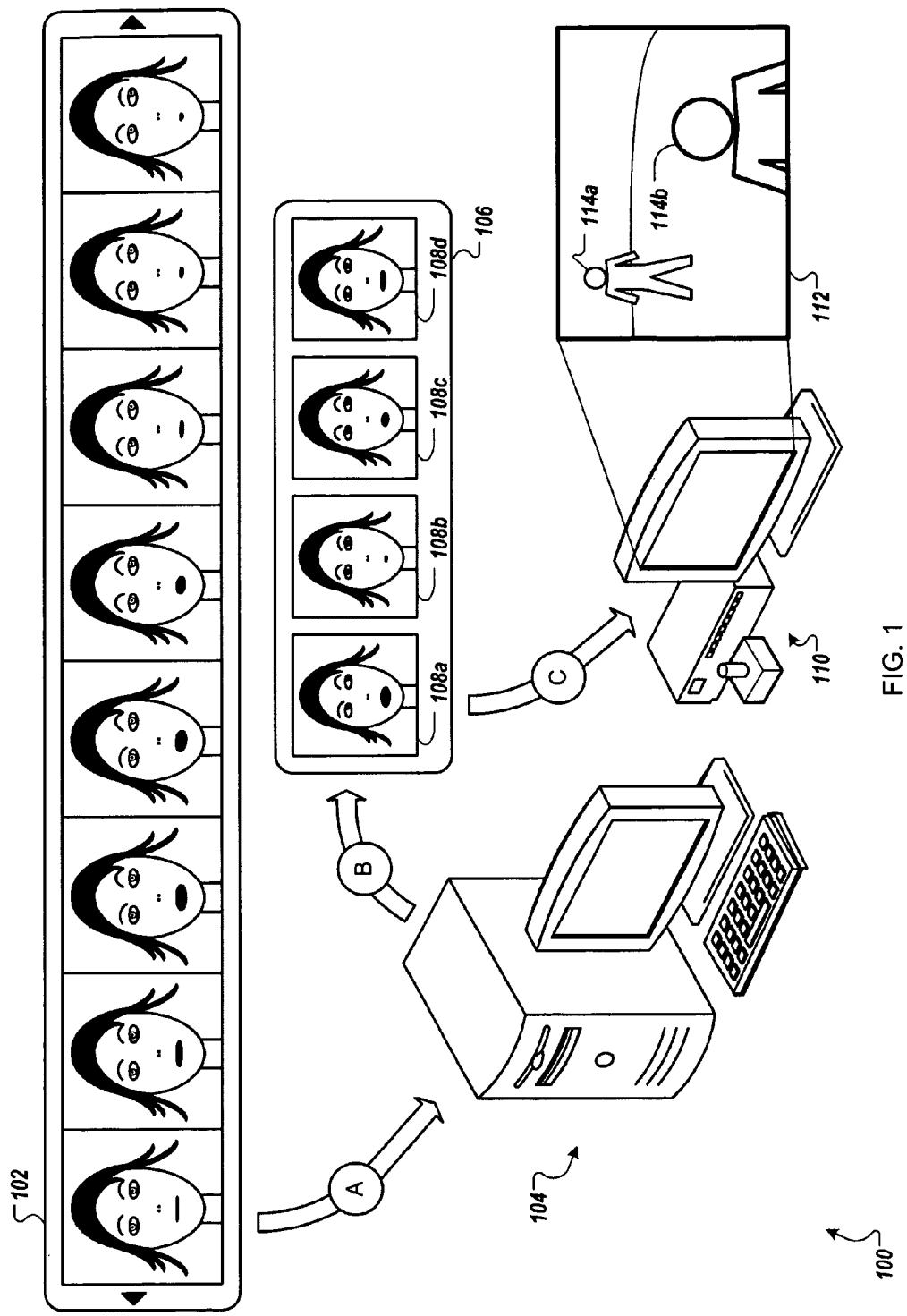
FIG. 1 illustrates an animation system.

FIG. 1 illustrates an exemplary animation system 100 for producing animations and for dynamically scaling animation quality. In some implementations, the animation system 100 can be used for providing animations for one or more types of video rendering environments such as video games, interactive virtual environments, etc. To provide such animation, the animation system 100 uses one or more processing techniques (e.g., compression) to allow efficient transferring of the animations and near real-time modification to the animations (e.g., based upon conditions of a video game or virtual environment).

For illustration, the animation system 100 processes an animation 102 that includes a series of frames that correspondence to a sequence of time. The animation 102 can be produced by using one or more techniques and methodologies such as skinning, simulation, motion capture, or blend shapes, to name a few examples. Various types of content may be included in the animation 102, for example, one or more characters (e.g., moving or stationary) or other types of objects (e.g., clothings) may be represented in the animation. In the present example, the animation 102 represents facial features of a character in a video game. Over a series of frames, the animation 102 illustrates the character changing its facial expressions (e.g., facial movements in relation to speech).

The animation system 100, in this example, includes one or more components such as a computer system 104 that can include one or more processing devices, input devices, output devices, and storage devices. Here, as shown by arrow A, the computer system 104 can receive the animation 102. The animation 102 can be embodied in one or more forms such as a computer file, a set of computer commands, motion capture video, or motion capture data, to name a few examples. In the present example, the animation 102 can be an animation file transferred to the computer system 104. In another example, the animation 102 can be generated within the computer system 104.

The computer system 104 can use one or more techniques to process the animation 102 for preparing the animation for transfer. For example, the animation may be compressed using one or more methods such as Principal Component Analysis (PCA), although other video compression techniques can be implemented individually or in combination with PCA. As represented by arrow B, a compressed animation model 106 can be produced by the computer system 104 based on the animation 102. The compressed animation model 106 in the present example includes a set of shapes 108a-d. The shapes 108a-d can, for example, include information that is associated with one or more objects (e.g., a character) or object features (e.g., a character's face, clothings, etc.), such as movement, positional, textural, color, lighting information, etc. Here, for example, the shapes 108a-d can be blend shapes that may be processed by a graphics engine. Each of the shapes 108-d can provide some information associated with the animation, and can be combined with the other shapes to represent a compilation of information associated with the animation 102. For example, the shape 108a can contain an amount of feature information associated with the animation 102 and shape 108b can contain a lesser amount of information (compared to shape 108a). In a similar manner, shape 108c can contain a less information (compared to shape 108b), and so forth. In the present example, four shapes (here, 108a-d) are produced to allow an approximation of the animation 102, although in other implementations, more or fewer shapes may be produced. Typically, producing additional shapes provides a more accurate approximation of the animation 102. For example, additional shapes may be combined (e.g., shape 108a and shape 108b) and provide refined animation details.

The animation system 100 also includes a display system 110 that includes a display screen 112 for viewing animations provided by the compressed animation model 106. The display system 110 can be a video game console or other type of computing device that may or may not have communication capabilities such as accessing a network such as the Internet. Various types of display technology may be utilized by the display screen 112, for example flat screen technology, a video projection technology, or virtual reality device technology, to name a few examples. The compressed animation model 106 can be transferred to the display system 110. For example, the compressed model 106 can be bundled with video game content contained on a physical medium such as a disc (e.g., a compact disc). Alternatively, rather than using a physical medium, the compressed animation model 106 can be transferred to the display system 110 using a network connection such as an Internet connection, or other type of networking technology.

In this particular example, the content of the compressed animation model 106 represents a face of an real-time video game character. By using the compressed animation model 106, an approximation of the animation 102 can be rendered and presented to illustrate changing facial expressions of the character on the display screen 112. In the present example, a character can be initially displayed at position 114a (e.g., a background position) on the screen 112. The character's face is less discernable since the size of the character is reduced to provide the perception of the background position. As such, less efficient processing and resource use is needed in rendering an appropriate level of detail for position 114a. To render the character's face, the display system 110 may use a reduced set (e.g., a subset) of the shapes 108a-d (e.g., only shape 108a) to compute the rough approximation. However, as the position changes (e.g., is moved into a foreground position 114b), the display system 110 can determine that a more accurate approximation of the animation 102 may be needed to correspondingly make adjustments to provide an appropriate level of resolution (e.g., for the character's face). In the present example, the system 110 may dynamically scale the quality of animation by increasing the number of shapes (e.g., shapes 108a-c or shapes 108a-d) to produce the face of the character. As such, the amount of shapes used to produce a character can be dynamically adjusted as needed to provide an appropriate level of detail.

One or more techniques or methodologies may be implemented to dynamically adjust the amount of shapes used to produce a character. For example, a reduced portion of shapes may be initially transferred prior to beginning an animation. As needs arise (e.g., producing characters with larger levels of detail), additional shapes may be transferred to supplement the initially transferred shapes. Referring to the present example, initially a subset of the shapes 108a-d (e.g., shape 108a) may be transferred to the device 110 as the animation begins and the remaining shapes (e.g., 108b, 108c, 108d) are transferred based upon need (e.g., a character being moved to a foreground position). Other combinations of transferred shapes may also be implemented, for example, a complete set of shapes (e.g., shapes 108a-d) may be initially transferred or no shapes may be initially transferred. For such a scenario, shapes may be transferred based strictly on need or another criteria.

In addition to considering a relative position of a character or object, other factors may be used to control the level of detail of an animation such as a character's face. For example, resource (e.g., processing power, bandwidth, memory limits) consumption and availability may be used in one or more factors. As such, image quality can be scaled up or down proportionally with resource availability. As another example, character importance (or other types of rendered objects) can be used to prioritize resource consideration and use. Important characters or objects can be given more system resources and/or given a higher animation quality than less important characters or objects, for example. As such, an unobstructed character may be assigned a higher importance (and more access to resources) compared to a partially obstructed character (e.g., a character face partially blocked by a crowd of other characters). As another example, the number of characters or objects simultaneously displayed can be considered. For example, if few characters or objects are displayed, the quality afforded to one or more character(s) or object(s) can be increased by the system 110; if many characters or objects are simultaneously displayed (e.g., a substantially populated crowd of characters), the quality afforded can be decreased.

Figure 2:
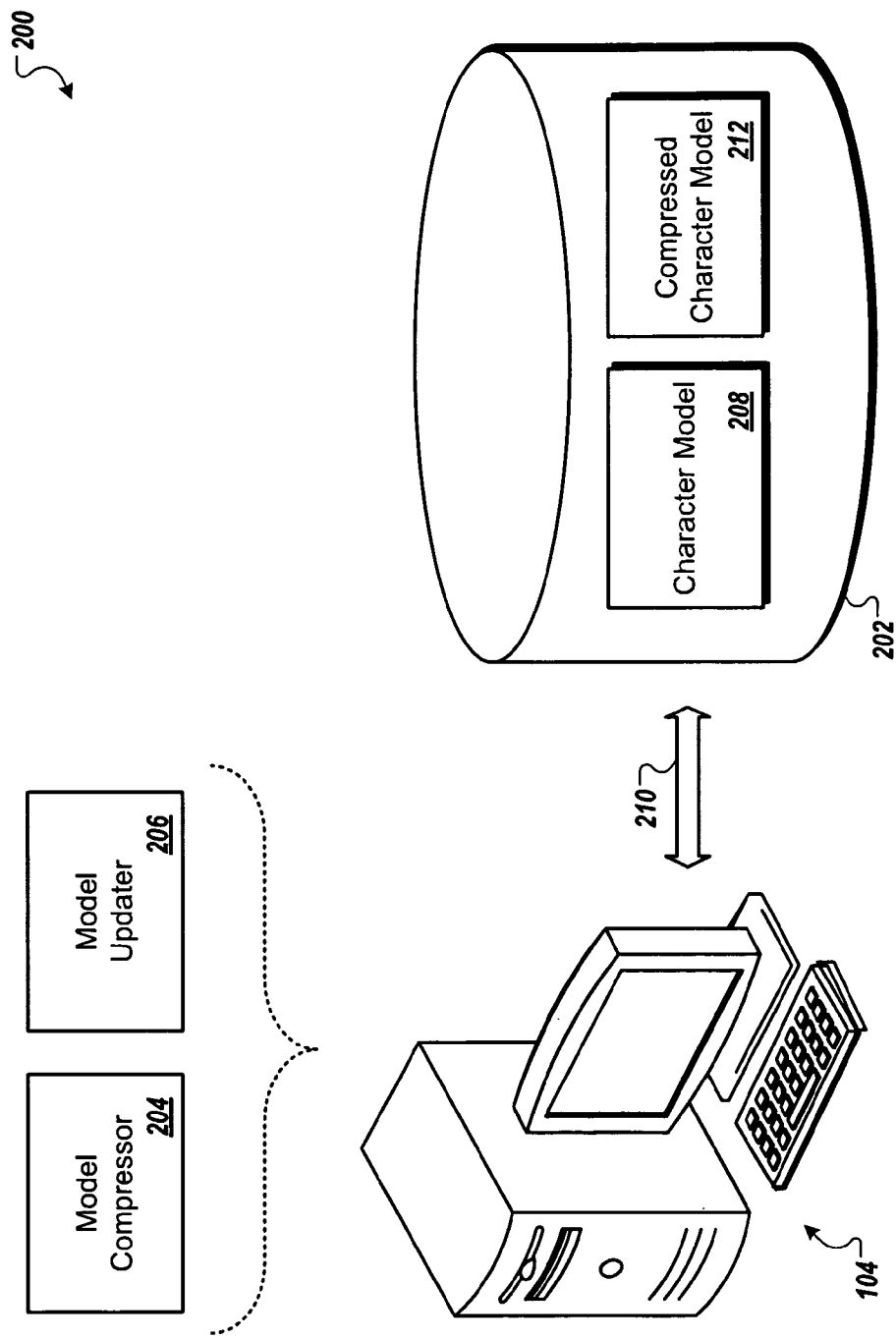
FIG. 2 illustrates a computer system for processing animations.

Referring to FIG. 2, an exemplary animation system 200 is capable of performing various operations (e.g., compressing, updating, storing, etc.) to produce animation models. In some implementations, animation models can be produced that provide adaptive animations for presenting in video games, virtual environments, or other types of media production. Here, for example, the animation system 200 includes the computer system 104 and a storage device 202. The computer system 104 includes software modules such as a model compressor 204 and a model updater 206, however, in some arrangements the functionality of one or more of the modules may be incorporated into hardware or a combination of software and hardware. While two distinct modules (e.g., the model compressor 204 and the model updater 206) are illustrated, in some arrangements the functionality of the modules may be combined into a single module or distributed across additional modules (e.g., three or more). One or more processing techniques and methodologies may be implemented by the model compressor 204 and the model updater 206 to produce the animations. For example, the model compressor 204 can compress one or more character animations or information related to one or more animations using a technique such as PCA.

The storage device 202 is typically capable of storing one or more character models (as illustrated with a character model 208). The character model 208 can, for example, include information associated with a character, such as movement or display information and/or one or more animations (e.g., a series of facial expressions of a character.) Here, for example, the character model 208 can be transferred to the system 104 by a wired or wireless connection 210. In the present example, the model 208 can be processed by the computer system 104 using the model compressor 204 and/or the model updater 206. In some implementations, for example, the model updater 206 can update a model based on information such as new or modified feature or movement information, or new or modified animation. For example, information or animation related to additional facial expressions may be incorporated by the model updater 206 to update or refine a previously produced character model. In the present example, a compressed and/or updated model can be saved to the storage device 202 by the computer system 104 as a compressed character model 212. Various types of data and information may be used for representing a character model (or a compressed character model), for example, one or more sets of shapes such as the shapes 108a-d (shown in FIG. 1) may be used to represent the compressed character model 212.

Figure 3:
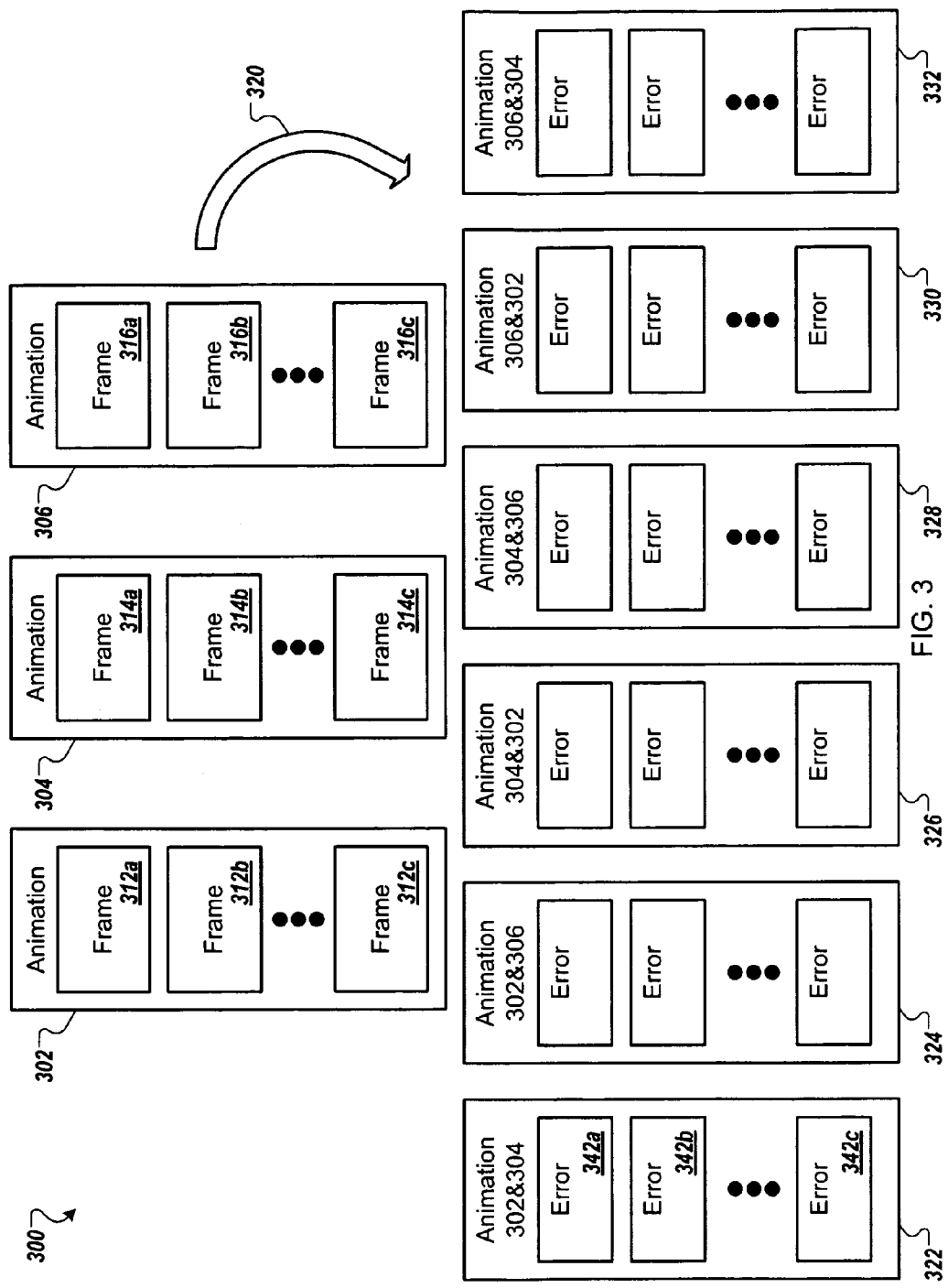
FIG. 3 illustrates comparing animations.

Referring to FIG. 3, prior to compressing animations, the model compressor 204 identifies that particular animations to be compressed. For example, animation with similar attributes (e.g., facial expressions of the same character) may be identified and grouped prior to being compressed. One or more techniques and methodologies may be used to identify similar animations. For example, by comparing the individual animations, the model compressor 204 can identify similar animations. In some implementations, one or more compared animations can be an animation such as the animation 102 (as shown in FIG. 1). For demonstrative purposes, three animations (e.g., animation 302, animation 304, animation 306) are compared for similarity.

Here, for example, the animation 302 includes a series of frames (e.g., frame 312a, frame 312b, frame 312c, etc.); the animation 304 includes a series of frames (e.g., frame 314a, frame 314b, frame 314c, etc.); and the animation 306 includes a series of frames (e.g., frame 316a, frame 316b, frame 316c, etc.). In some implementations, more or fewer animations can be compared, and similarly, more or fewer frames may be included in the comparisons. In some implementations, a compressed animation can be compared with an uncompressed animation, or a compressed animation can be compared with another compressed animation, or other type of animation combination.

As represented by an arrow 320, the animations 302, 304, and 306 can be compared by the model compressor 204 or by similar operations of one or more other modules. In one implementation, a comparison may quantify similarities (such as similar movements of facial features of animated characters) between animations. Various quantities may be used to represent the similarities. For example, corresponding frames from each animation may be compared to quantify the difference between each frame pair. As represented in the figure, such a comparison define a series of errors based on frame comparisons. In particular, an animation comparison 322 represents the frame by frame difference between the animation 302 and the animation 304. Similarly, animation comparisons 324, 326, 328, 330 and 332 respectively represent the comparisons (e.g., referred to as errors) between the animation 302 and the animation 306, the animation 304 and the animation 302, the animation 304 and the animation 306, the animation 306 and the animation 302, and between the animation 306 and the animation 304. Other techniques and methodologies may also be included in the comparisons to identify similarities. For example, similarities may be weighted to emphasize different areas, e.g., of a model, to emphasize one or more points in time, or other characteristics.

For one comparison technique, one or more differences or distances (errors) are defined between one or more animations. For example, a cost of projection of a first animation $A_i$ onto a second animation $A_j$ can be expressed as $C(A_i, A_j)$. In one implementation, the quantity $C(A_i, A_j)$ may be calculated, for example, as a sum of the errors (e.g., errors 342a, 342b, ..., 342c) for each animation comparison (e.g., animation comparison 322). A distance between animation $A_i$ and $A_j$, can be expressed as $D(A_i, A_j) = \min(C(A_i, A_j), C(A_j, A_i))$. Referencing the comparison 322, animation 302 is compared to animation 304 (e.g., a projection of the animation 302 onto the animation 304), and a set of errors 342a, 342b, 342c, etc. can be calculated on a per frame basis. The comparisons 322, 324, 326, 328, 330, and 332 can also, for example, involve one or more calculations for generating values related to differences or distances (errors).

In the present example, calculated differences or distances (errors) may be represented in a structure such as a matrix for further processing and/or analysis. Here, for example, values representative of the comparisons can be stored for further processing by a software module, such as the model compressor 204. In the present example, the model compressor 204 can group or cluster related animations by performing a clustering algorithm, such as leader-based clustering. A clustering algorithm can determine, for example based on quantified similarities, that a set of animations can be considered to be similar for purposes of processing (e.g., compressing) as a group. For example, a segment of animation depicting character speech can include features similar to one or more other segments of animation, and the animation segments can further processed (compressed) in association with one another, taking into account common features and/or movements.

Figure 4:
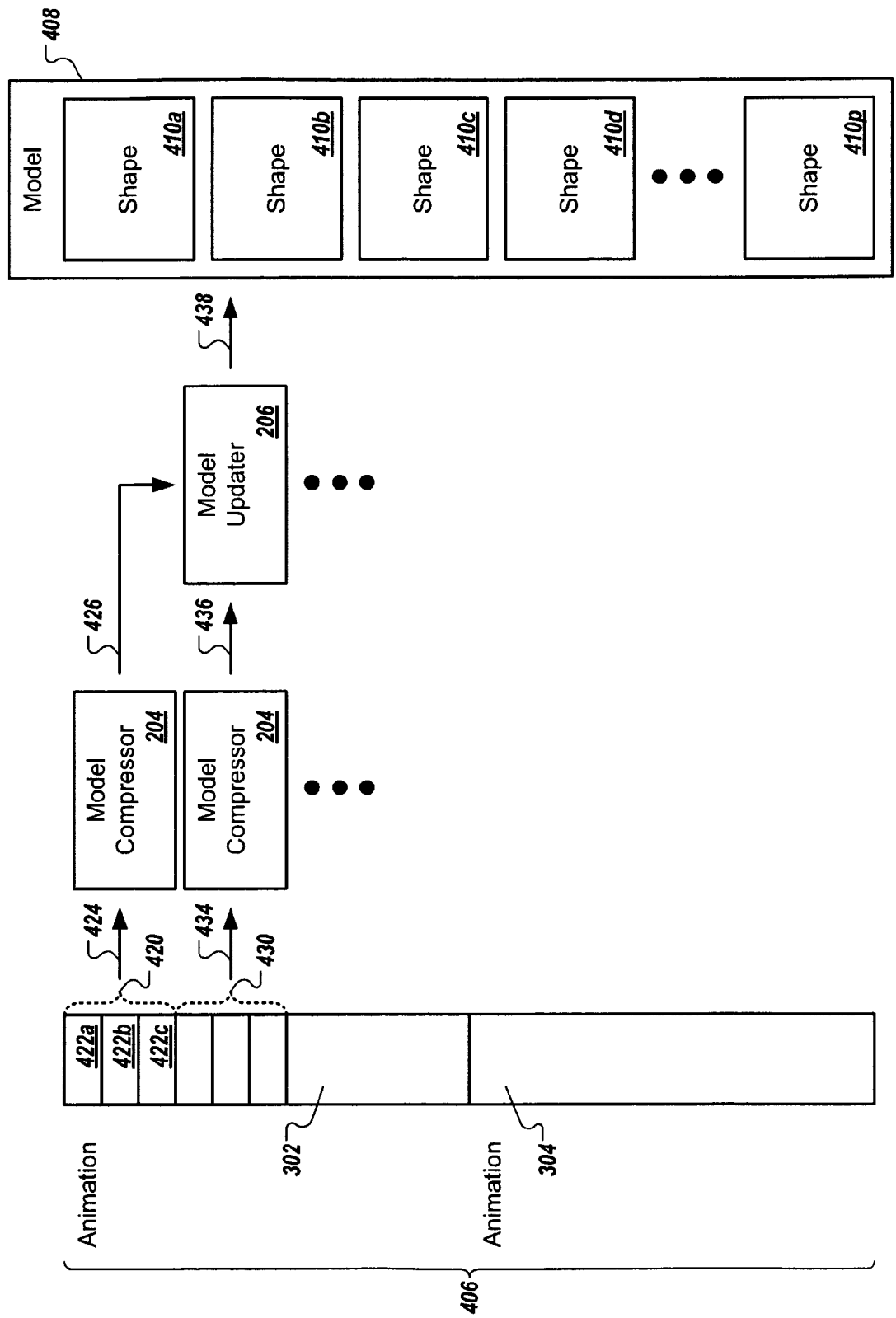
FIG. 4 illustrates processing animations into an animation model.

FIG. 4 illustrates operations associated with combining animations to produce an animation model. Along with compressing the animations, exemplary updating operations are illustrated to produce the animation model. In some implementations, a determination to combine animations can be made based on quantified similarities between animations (as shown in FIG. 3).

In the present example, the animation 302 and the animation 304 can be combined. The combination can, for example, include compressed or uncompressed animations. Here, for example, the animations 302 and 304 are uncompressed. One or more techniques or methodologies may be used to combine the animations 302 and 304; for example, file or data concatenation, linking, and compilation techniques may be implemented individually or in combination. As illustrated, the animation 302 and the animation 304 are concatenated to form a combined animation 406, although additional animations may also be combined with the combined animation 406 using similar techniques.

In the present example, a compressed model 408 (e.g., a compressed character model) can be produced from the combined animation 406. The compressed model 408 can include a set of shapes (e.g., PCA vectors) or other types of objects. For example, the model may include a sets of masks that specify one or more sets of facial features to which the model is associated and may be applied. As illustrated in the figure, in this example, the model 408 includes a set of 16 shapes (e.g., shapes 410a, b, c, d, etc., and a shape 410p), however, in some implementations, more or less shapes may be included. In the present example, shapes included in the compressed model 408 can be used to approximate the animations 302 and 304 included in the combined animation 406. In general, the size of the compressed model 408 can be less than the size of the combined animation 406, however, in some arrangements the size may be larger or equivalent.

The model compressor 204 and the model updater 206 may use one or more techniques to produce the compressed model 408; for example, compression of the combined animation 406 can include compressing of one or more animation segments. In the present example, the combined animation 406 can be divided into segments such as a first segment 420 and a second segment 430. In some arrangements, a segment can be defined as one or more animation frames, animation time intervals, a set or grouping of animation features, or a set or grouping of model shapes, etc.

In this arrangement, the first segment 420 includes animation frames 422a, 422b, and 422c. As represented by process arrow 424, the segment 420 can be compressed by the model compressor 204 and the corresponding compressed information can be provided (as represented by process arrow 426) to the model updater 206. In the present example, the set of sixteen shapes 410a-p is produced from the first segment 420 and subsequently updated by the model updater 206, using compressed information related to additional segments. In some implementations, a set of shapes can be initially included in the compressed model 408 and represent a previously compressed animation or character model.

In this example, the compressed model 408, based on a compression of the first segment 420, is updated with compressed information from the second segment 430. As illustrated by process arrow 434, the second segment 430 can be compressed in a similar manner by the model compressor 204 and the corresponding compressed segment can be provided (shown by process arrow 436) to the model updater 206; and as shown by process arrow 438, the model updater 206 can update the compressed model 408 (including the sixteen shapes 410a-410p) based on the second segment 430. Updating can take many forms, for example, information associated with similar shapes may be updated. In one implementation, PCA vectors associated with a shape (e.g., shape 410a) may be adjusted to account for information from another segment or multiple segments. Updating may also including filtering or blocking information, for example, a predefined number of segments may be needed to initiate an update. As such, information from a lesser number of segments (e.g., a single segment) may be discounted until the predefined number of segments is attained.

The model updater 206 may also use incremental updating techniques, for example, one or more vectors (e.g., generated by a PCA) representing one or more of the sixteen shapes 410a-410p can be incrementally modified such that the content of segment 430 can be represented by the model 408. During processing of each segment or frame, for example, a determination can be made by the updater 206 as to how well a segment or frame can be represented by the sixteen shapes 410a-410p. For example, if a segment or frame can be relatively well-represented by the shapes 410a-410p, the updater 206 may make a small change or no change to one or more of the shapes 410a-410p. Alternatively, if a segment or frame can be less well-represented, the updater 206 may make a larger change to one or more of the shapes 410a-410p. In some implementations, a weighting or filtering of information related to animation can be performed by the updater 206. For example, as recently received information is considered by the updater 206 for modification of the model 408, the updater 206 can weigh information to not drastically affect the model (e.g., state of PCA vectors). Such weighting can depend upon the amount of information to be processed. A weighing or filtering process can, for example, have a filtering effect (e.g., by downplaying or disregarding anomalies) to generate a model accurately representing an animation.

By incorporating content from additional segments (and animations) the compressed model 408 may be further updated and refined. Through such refinements, the compressed model 408 may be capable of representing broader scope of character features (e.g., facial expressions). For example, the model 408 can be further refined by processing additional segments to approximate the animations 302 and 304. In some implementations, one or more animations or segments can be added to the combined animation 406 after an initial processing of animation has occurred. For example, after processing some or all of the animations and/or segments included in the combined animation 406, additional animations and/or segments can be added to the animation 406 and processed. In some implementations, one or more animations or segments can be added to the combined animation 406 during processing, for example to update a compressed animation model in real-time.

Figure 5:
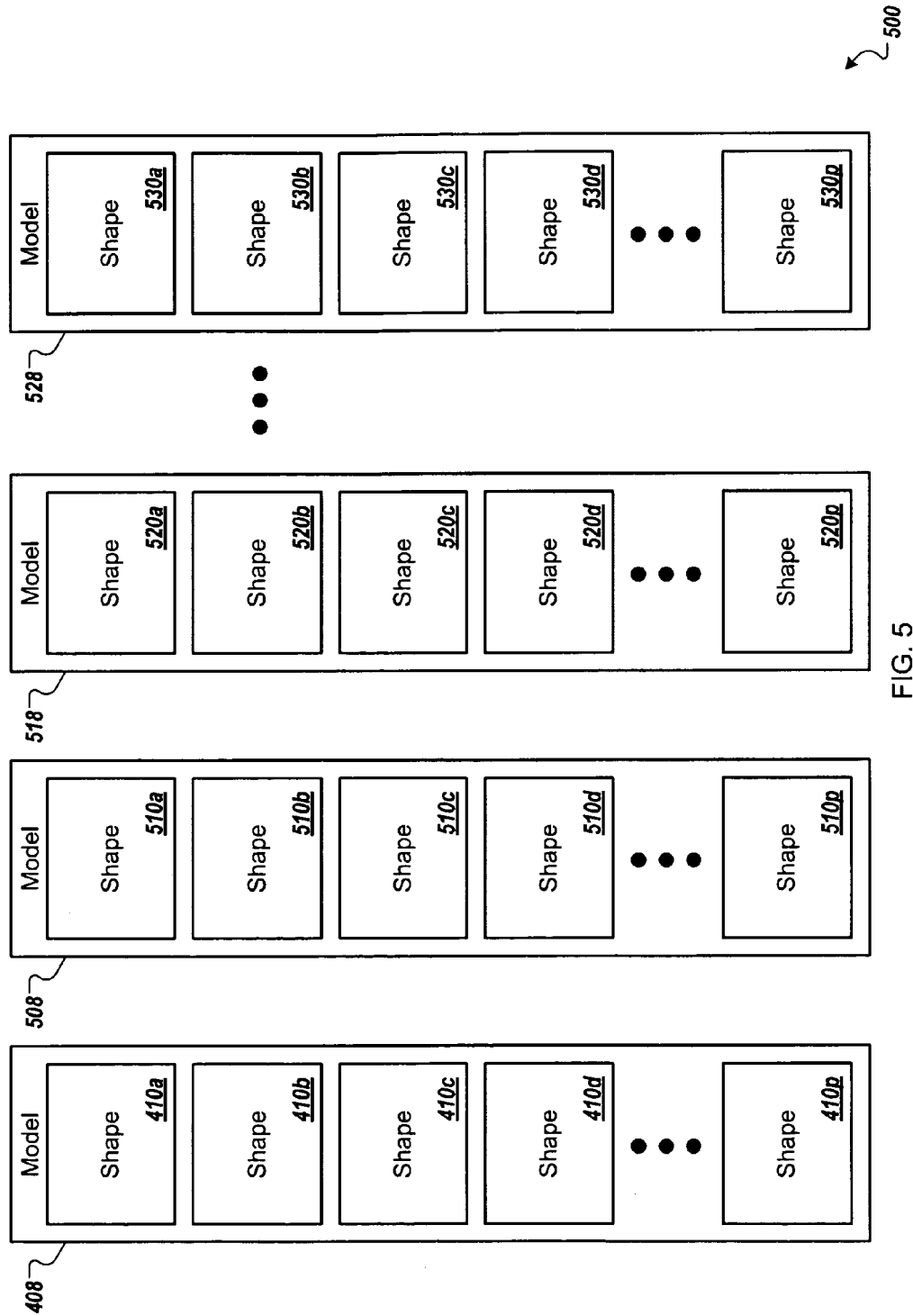
FIGS. 5 and 6 illustrate groups of animation models.

FIG. 5 illustrates an example of a grouping 500 of models. In some implementations, grouped models can be created by a process for combining, compressing, and/or updating animation models, as shown in FIG. 4.

In the present example, the grouping 500 includes eight grouped models: the compressed animation model 408, a compressed animation model 508, a compressed animation model 518, a compressed animation model 528, etc. Here, for example, the model 408 can be produced by combining and compressing two animations (such as the animations 302 and 304 shown in FIG. 4, for example) and can include sixteen shapes (410a-410p). Other models included in the grouping 500 can, for example, also be produced by combining and compressing animations and can also include sixteen shapes. In the present example, the model 508 includes sixteen shapes 510a-510p, the model 518 includes sixteen shapes 520a-520p, the model 528 includes sixteen shapes 530a-530p, etc. In some implementations, the grouping 500 may include more or fewer models, furthermore, grouped models may individually include an equivalent or different number of shapes. Also, more or less (than sixteen shapes) may be included in each model.

In the present example, the grouped models 408, 508, 518, 528, etc. can be used to approximate many animations. In some implementations, grouped models can be used in creating and/or rendering animation for a display system such as the display system 110 shown in FIG. 1.

Figure 6:
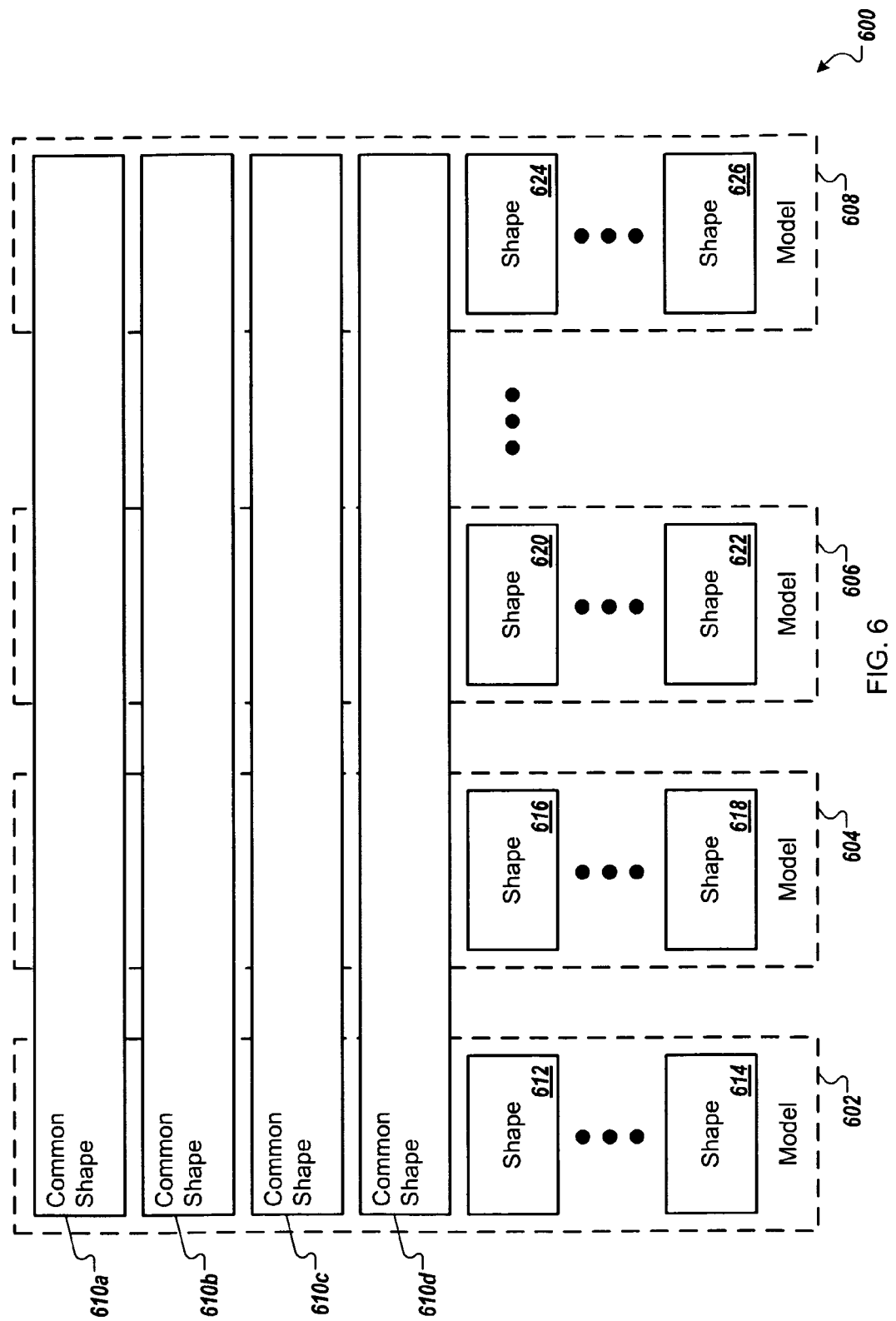

FIG. 6 illustrates an example of a group of models in which a common set of shapes is shared by the models within the group. In the present example, a grouping 600 includes eight grouped models represented as: a model 602, a model 604, a model 606, a model 608, etc. In some implementations, the grouping 600 can include more or fewer grouped models.

Also, in this example, each grouped model includes sixteen shapes, however, each grouped model can include more or fewer shapes.

In the present example, the eight grouped models 602, 604, 606, etc., and 608 can be considered similar to the grouped models of FIG. 5 (e.g., grouped models 408, 508, 518, 528, etc.). For example, some of the grouped models (in FIG. 5) and/or the underlying animations of the models can be combined and compressed to produce the models (of the grouping 600) that share common shapes.

In some implementations, a subset of shapes can be shared among a plurality of combined and compressed animations. Here, for example, a set of common shapes can include a common shape 610$a$, a common shape 610$b$, a common shape 610$c$, and a common shape 610$d$. In the present example, the four common shapes 610$a$-610$d$ can be included in each of the models of the grouping 600, however, in some arrangements, more, fewer, or different collections of shapes may be common.

In the present example, the four common shapes 610$a$-610$d$ may provide approximate renderings (e.g., a relatively lower level of detail) of the animations from the models of the grouping 600. For example, the common shapes 610$a$-610$d$ may provide an approximate animation for a character (e.g., the facial expression of a character located in the background of a scene) or object in a video game or virtual environment. For such approximations, a lower level of detail is adequate for a viewer. However, as more detail is needed (e.g., character moves into the foreground), the appropriate non-common shapes (e.g., shape 612, shape 616, etc.) may be utilized. As such, a relatively higher level of detail may be presented (e.g., on the display device 110 shown in FIG. 1). Thus, from some situations, the common shapes 610$a$-$d$ may be initially transferred or loaded (onto the display device 110) to reduce resource compensation (e.g., processing power, memory, etc.) while still providing reasonable animation details. Then, only after the situation changes (a character moving into the foreground) are additional shapes transferred or loaded (onto the display device 110). As such, system resources and bandwidth are conserved until consumption is needed to provide a higher level of detail.

In the present example, after the four common shapes, each group model (e.g., model 602, 604, etc.) has unique set of shapes for the fifth through sixteenth shapes. In particular, model 602 includes a shape 612, a shape 614, etc.; the model 604 includes a shape 616, a shape 618, etc.; the model 606 includes a shape 620, a shape 622, etc.; and the model 608 includes a shape 624, a shape 626, etc. Similar groups (not shown) may or may not include a set of common shapes (that are shared with on or more other groups) and a set of shapes unique to the group.

Figure 7:
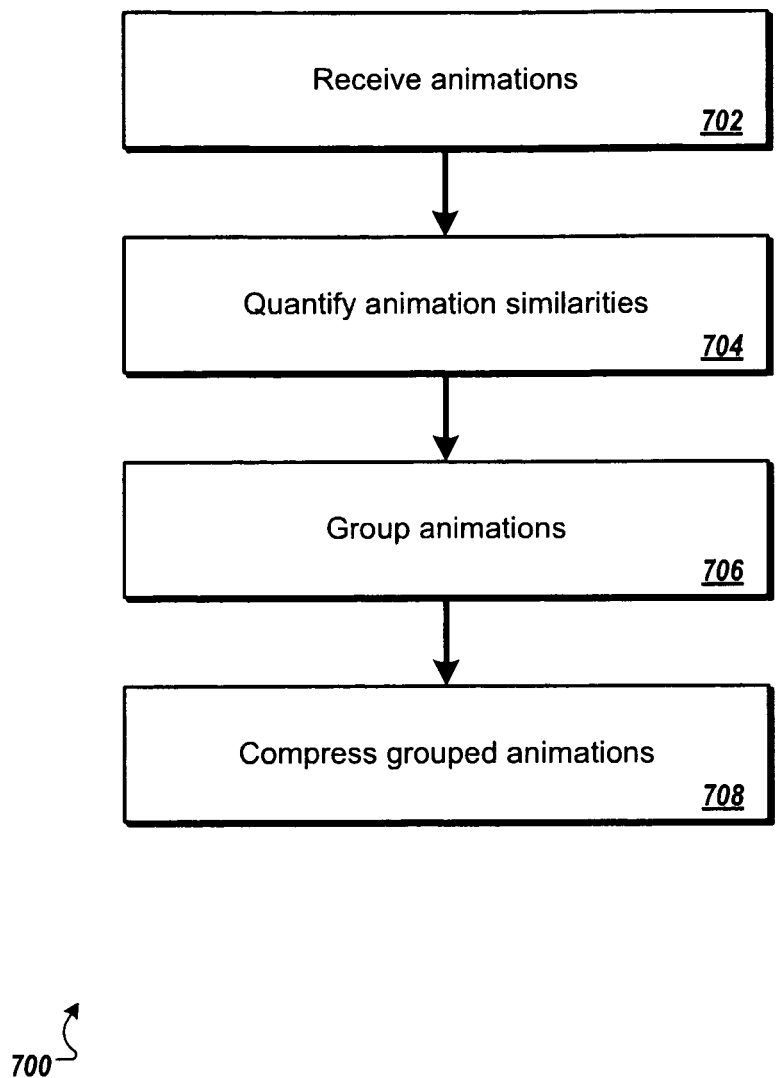
FIG. 7 is a flowchart that represents operations of model compressor.

Referring to FIG. 7, a flowchart 700 represents some of the operations of the model compressor 204. The operations may be executed by a single computer system (e.g., the computer system 104) or multiple computing devices. Along with being executed at a single site (e.g., at one computer system), operation execution may be distributed among two or more sites. Operations include receiving 702 animations (e.g., the animations 302, 304, and 306 as shown in FIG. 3). Operations may also include quantifying 704 similarities among the received animations. For example, quantifying may include comparing the animations for similarities, such as similar movements of animated characters or objects. Operations may also include grouping 706 of animations based on the quantified similarity. For example, animations can be grouped by performing a clustering algorithm (e.g., leader-based clustering) based on quantified similarities. Operations of the model compressor 704 may also include compressing 708 the grouped animations. For example, compression can be performed using a compression technique such as PCA.

To perform the operations described in flow chart 700, the model compressor 204 may perform any of the computer-implemented methods described previously, according to one implementation. For example, a computer system such as computer system 104 (shown in FIG. 2) may execute the model compressor 204. The computer system 104 may include a processor (not shown), a memory (not shown), a storage device (e.g., storage device 202), and an input/output device (not shown). Each of the components may be interconnected using a system bus or other similar structure. The processor is capable of processing instructions for execution within the computer system. In one implementation, the processor is a single-threaded processor, however, one or more multi-threaded processors may be used in other implementations.

Figure 8:
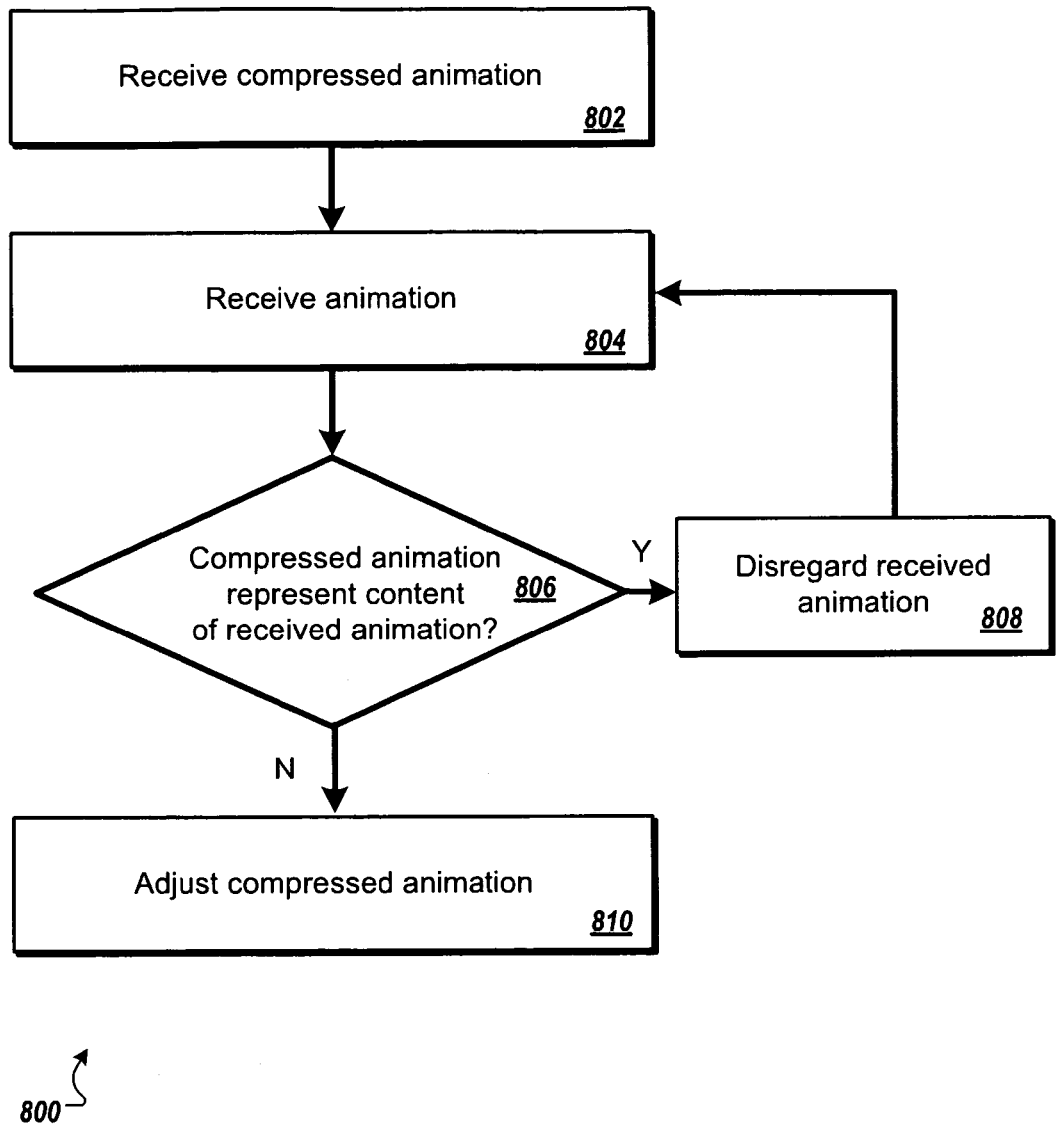
FIG. 8 is a flowchart that represents operations of a model updater.

Referring to FIG. 8, a flowchart 800 represents some operations of the model updater 206. However, in some implementations the model compressor 204 may be capable of executing one or more similar operations independently or in combination with the model updater 206. The operations may be executed by a single computer system (e.g., the computer system 104) or multiple computing devices. Along with being executed at a single site (e.g., at one computer system), operation execution may be distributed among two or more sites.

Operations include receiving 802 a compressed animation, for example, from a storage device or other source (e.g., the storage device 202). Operations may also include receiving 804 an animation (e.g., also from the storage device 202) for updating the compressed animation. Upon receiving the compressed animation and the animation (for updating the compressed animation), operations may include determining 806 if the compressed animation represents the content of the received animation. For example, the compressed animation may have been produced from a large number of video frames (e.g., 16,000 frames) and the animation received for updating may include a relative small number of frames (e.g., a single frame). As such, the compressed animation could already represent the content of the received animation (and not needed to be updated). If the content is already represented, operations may include disregarding 808 the received animation, and returning to receive additional animation (that might be used to update the compressed animation). If the content is not represented, operations of the model updater 206 may include adjusting 810 the compressed animation. For example, one or more PCA vectors of a compressed animation may be adjusted such that the content of the received animation are represented by compressed animation. Other processing operations may also be used for adjusting compressed animations. For example, adjustments may be weighted such that a relatively small animation (e.g., a single frame) does not drastically change an animation compressed from a large amount of content (e.g., thousands of video frames). Other processing operations may also be implemented, for example, concatenation, linking, and compilation techniques performed individually or in combination.

To perform the operations described in flow chart 800, one or both of the model compressor 204 and the model updater 206 may perform any of the computer-implemented methods described previously, according to one implementation. For example, a computer system such as the computer system 104 (shown in FIG. 2) may execute the model compressor 204 and/or the model updater 206. The computer system 104 may include a processor (not shown), a memory (not shown), a storage device (e.g., storage device 202), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

Figure 9:
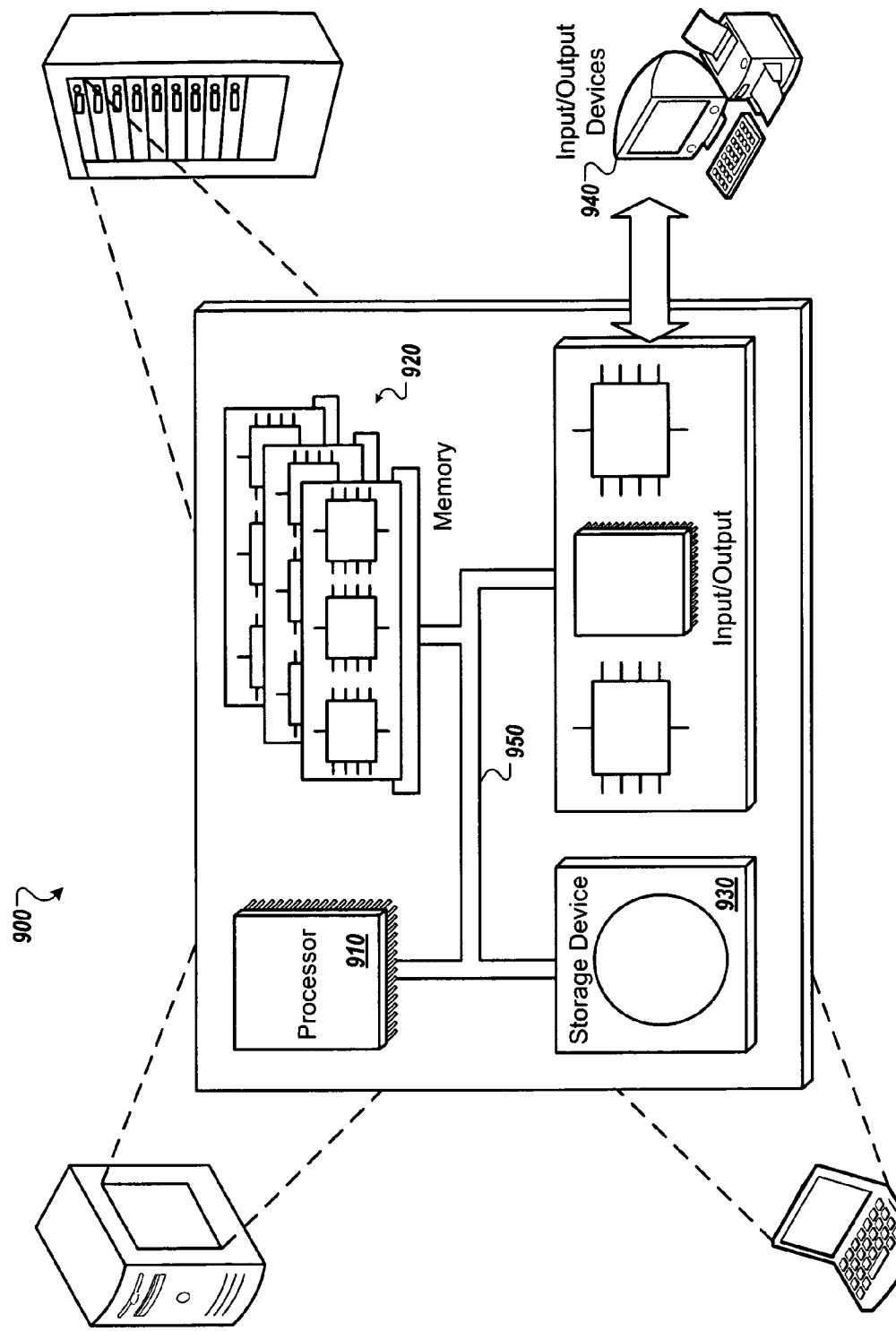
FIG. 9 represents a computer system and related components.

FIG. 9 is a schematic diagram of a generic computer system 900. The system 900 can be used for the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit in some implementations and is a non-volatile memory unit in other implementations.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
quantifying similarities between a first multi-frame animation and a second multi-frame animation by determining a difference between content of corresponding frame pairs from the first multi-frame animation and the second multi-frame animation, and by summing the frame pair differences;
combining the first and second multi-frame animations based upon the quantified similarities to produce a combined animation;
compressing the combined animation to produce a first model that represents the content of the first animation and the second animation, wherein the first model includes a finite number of shapes;
grouping the first model with a plurality of other models that share a common subset of shapes, wherein the common subset of shapes provides approximate renderings and wherein a set of non-common shapes provides detailed renderings; and initially transmitting the common set of shapes when only approximate renderings of the first and second multi-frame animations are needed.

2. The computer-implemented method of claim 1, wherein the first model includes sixteen shapes.

3. The computer-implemented method of claim 2, wherein a portion of the sixteen shapes of the first model is shared by a second model.

4. The computer-implemented method of claim 1, wherein compressing the first and second animations includes performing a principal component analysis.

5. The computer-implemented method of claim 1, wherein compressing the first animation and the second animation includes compressing the first animation and updating the compressed first animation with the second animation.

6. The computer-implemented method of claim 5, wherein updating the compressed first animation includes adjusting a principal component analysis vector.

7. The computer-implemented method of claim 5, wherein updating the compressed first animation includes disregarding a portion of the second animation.

8. The computer-implemented method of claim 1, wherein the first animation and the second animation are associated with facial expressions of an online animated character.

9. The computer-implemented method of claim 8, wherein quantifying similarities includes quantifying similar movements of features of the face of the online animated character.

10. The computer-implemented method of claim 8, wherein the online character is included in a video game.

11. The method of claim 1, wherein combining the first and second multi-frame animations includes grouping the first and second multi-frame animations in a cluster, based on the quantified similarities.

12. A system comprising:
a computing device comprising:
a memory for storing at least a first multi-frame animation and a second multi-frame animation;
a model compressor configured to:
quantify similarities between the first multi-frame animation and the second multi-frame animation by determining a difference between content of corresponding frame pairs from the first multi-frame animation and the second multi-frame animation, and by summing the frame pair differences,
combine the first and second multi-frame animations based upon the quantified similarities to produce a combined animation, the combined animation to produce a first model that represents the content of the first animation and the second animation, wherein the first model includes a finite number of shapes,
group the first model with a plurality of other models that share a common subset of shapes, wherein the common subset of shapes provides approximate renderings and wherein a set of non-common shapes provides detailed renderings, and
initially transmit the common set of shapes when only approximate renderings of the first and second multi-frame animations are needed.

13. The system of claim 12, wherein the first model includes sixteen shapes.

14. The system of claim 13, wherein a portion of the sixteen shapes of the first model is shared by a second model.

15. The system of claim 12, wherein, to compress the first and second animations, the model compressor performs a principal component analysis.

16. The system of claim 12, wherein the computing device further includes:

a model updater for updating the first model with at least an additional animation.

17. The system of claim 16, wherein the model updater is configured to adjust a principal component analysis vector for updating the first model.

18. The system of claim 16, wherein the model updater is configured to disregard a portion of the additional animation.

19. The system of claim 12, wherein the first animation and the second animation is associated with facial expressions of an online animated character.

20. The system of claim 19, wherein, to quantify similarities, the model compressor is configured to quantify similar movements of features of the face of the online animated character.

21. The system of claim 19, wherein the online character is included in a video game.

22. The system of claim 12, wherein the model compressor is configured to group the first and second multi-frame animations in a cluster, based on the quantified similarities.

23. A computer program product tangibly embodied in a storage device and comprising instructions that when executed by a processor, perform a method comprising:
quantifying similarities between a first multi-frame animation and a second multi-frame animation by determining a difference between content of corresponding frame pairs from the first multi-frame animation and the second multi-frame animation, and by summing the frame pair differences;
combining the first and second multi-frame animations based upon the quantified similarities to produce a combined animation;
compressing the combined animation to produce a first model that represents the content of the first animation and the second animation, wherein the first model includes a finite number of shapes;
grouping the first model with a plurality of other models that share a common subset of shapes, wherein the common subset of shapes provides approximate renderings and wherein a set of non-common shapes provides detailed renderings; and
initially transmitting the common set of shapes when only approximate renderings of the first and second multi-frame animations are needed.

24. The computer program product of claim 23, wherein the first model includes sixteen shapes.

25. The computer program product of claim 24, wherein a portion of the sixteen shapes of the first model is shared by a second model.

26. The computer program product of claim 23, wherein compressing the first and second animations includes performing a principal component analysis.

27. The computer program product of claim 23, wherein compressing the first animation and the second animation includes compressing the first animation and updating the compressed first animation with the second animation.

28. The computer program product of claim 27, wherein updating the compressed first animation includes adjusting a principal component analysis vector.

29. The computer program product of claim 27, wherein updating the compressed first animation includes disregarding a portion of the second animation.

30. The computer program product of claim 23, wherein the first animation and the second animations are associated with facial expressions of an online animated character.

31. The computer program product of claim 30, wherein quantifying similarities includes quantifying similar movements of features of the face of the online animated character.

32. The computer program product of claim 30, wherein the online character is included in a video game.

33. The computer program product of claim 23, wherein combining the first and second multi-frame animations includes grouping the first and second multi-frame animations in a cluster, based on the quantified similarities.

\* \* \* \* \*

UNITED STATES PATENT AND TRADEMARK OFFICE
CERTIFICATE OF CORRECTION

| | | |
|---|---|---|
| PATENT NO. | : 8,633,932 B1 | Page 1 of 1 |
| APPLICATION NO. | : 12/504263 | |
| DATED | : January 21, 2014 | |
| INVENTOR(S) | : Frederic P. Pighin et al. | |

It is certified that error appears in the above-identified patent and that said Letters Patent is hereby corrected as shown below:

In the Claims

At column 13, line 44
    Please delete "differences," and insert --differences;--

At column 13, line 50
    Please delete "shapes," and insert --shapes;--

At column 13, line 55
    Please delete "renderings," and insert --renderings;--

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,633,932 B1  
APPLICATION NO. : 12/504263  
DATED : January 21, 2014  
INVENTOR(S) : Frederic P. Pighin et al.

Page 1 of 1

It is certified that error appears in the above-identified patent and that said Letters Patent is hereby corrected as shown below:

In the Specification

At column 13, line 1
  Please delete "set" and insert --subset--

At column 13, line 56
  Please delete "set" and insert --subset--

At column 14, line 41
  Please delete "set" and insert --subset--

Signed and Sealed this
Fourteenth Day of October, 2014

Michelle K. Lee
*Deputy Director of the United States Patent and Trademark Office*